(12) United States Patent
Filip et al.

(10) Patent No.: US 8,885,952 B1
(45) Date of Patent: Nov. 11, 2014

(54) METHOD AND SYSTEM FOR PRESENTING SIMILAR PHOTOS BASED ON HOMOGRAPHIES

(75) Inventors: Daniel J. Filip, San Jose, CA (US); Daniel Cotting, Islisberg (CH)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 13/408,814

(22) Filed: Feb. 29, 2012

(51) Int. Cl.
*G06K 9/62* (2006.01)

(52) U.S. Cl.
USPC ............................................. 382/225

(58) Field of Classification Search
None
See application file for complete search history.

(56) References Cited

U.S. PATENT DOCUMENTS

| | | | |
|---|---|---|---|
| 7,519,236 B2* | 4/2009 | Cheng et al. | 382/305 |
| 8,189,925 B2* | 5/2012 | Kroepfl et al. | 382/216 |
| 8,345,961 B2* | 1/2013 | Li et al. | 382/154 |
| 8,488,040 B2* | 7/2013 | Chen et al. | 348/333.02 |
| 2012/0155778 A1* | 6/2012 | Buchmueller et al. | 382/209 |
| 2012/0269439 A1* | 10/2012 | Yang et al. | 382/190 |
| 2012/0327184 A1* | 12/2012 | Zhu et al. | 348/36 |
| 2013/0155058 A1* | 6/2013 | Golparvar-Fard et al. | 345/419 |

OTHER PUBLICATIONS

Large scale image retrieval in urban environments with pixel accurate image tagging, by Jerry Zhang, Tech. report No. UCB/EECS-2011-145, Dec. 16, 2011.*
Location based image retrieval for urban environments, by Zhang et al, 2011 18th IEEE International conference on Image Processing.*
Efficient image retrieval for 3D structures, by Arandjelovic et al. Department of Engineering Science University of Oxford, 2010.*
Serradell et al., "Combining Geometric and Appearance Priors for Robust Homography Estimation," downloaded from cvlab.epfl.ch/~lepetit/papers/serradell_eccv10.pdf, in European Conference on computer vision, Sep. 5-11, 2010.

* cited by examiner

*Primary Examiner* — Vikkram Bali
(74) *Attorney, Agent, or Firm* — Lerner, David, Littenberg, Krumholz & Mentlik, LLP

(57) ABSTRACT

Methods, systems, and articles of manufacture for presenting similar images are disclosed. A method for presenting similar images on a display device is disclosed. The method includes displaying a first image on the display device; determining one or more homographic relationships between the first image and a plurality of images; identifying, using the determined one or more homographic relationships, at least one image having a scene and a perspective which are similar to that of the first image; and displaying the identified image. Corresponding system and computer readable media embodiments are also disclosed.

18 Claims, 6 Drawing Sheets

METHOD AND SYSTEM FOR PRESENTING SIMILAR PHOTOS BASED ON HOMOGRAPHIES

BACKGROUND

1. Field

This disclosure relates generally to selecting images for display.

2. Background

With the widespread availability of digital cameras and cameras integrated into mobile phones and handheld devices, large numbers of images are regularly uploaded onto various web-based image applications. Users often desire to access these huge image collections based on various criteria. The criteria may include accessing multiple similar images and accessing multiple images of the same geographic location. Conventional approaches display images based upon matching objects visible in images and/or based upon geographic coordinates. In large image collections, presenting images simply based upon matching features and geo-location information may not be adequate. Due to the increasing number of images in these collections, more efficient methods and systems to access the images are needed.

SUMMARY OF EMBODIMENTS

Methods, systems, and articles of manufacture for presenting similar images are disclosed. An embodiment is a computer-implemented method for presenting similar images on a display device. The method includes displaying a first image on the display device; determining one or more homographic relationships between the first image and a plurality of images; identifying, using the determined one or more homographic relationships, at least one image having a scene and a perspective which are similar to that of the first image; and displaying the identified image.

Another embodiment is a system including: a processor; a display device coupled to the processor and configured to display a first image; an image homography generator executed on the processor and configured to determine homographic relationships between the first image and a plurality of images; and a similar image selector executed on the processor and configured to identify, using the determined homographic relationships, at least one image having a scene and a perspective which are substantially similar to that of the first image.

Yet another embodiment is an article of manufacture including a non-transitory computer readable medium having encoded instructions thereon that in response to execution by a computing device cause the computing device to perform operations. The performed operations include: displaying a first image on the display device; determining homographic relationships between the first image and a plurality of images; identifying, using the determined homographic relationships, at least one image having a scene and a perspective which are substantially similar to that of the first image; and displaying the identified image.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Figure 1:
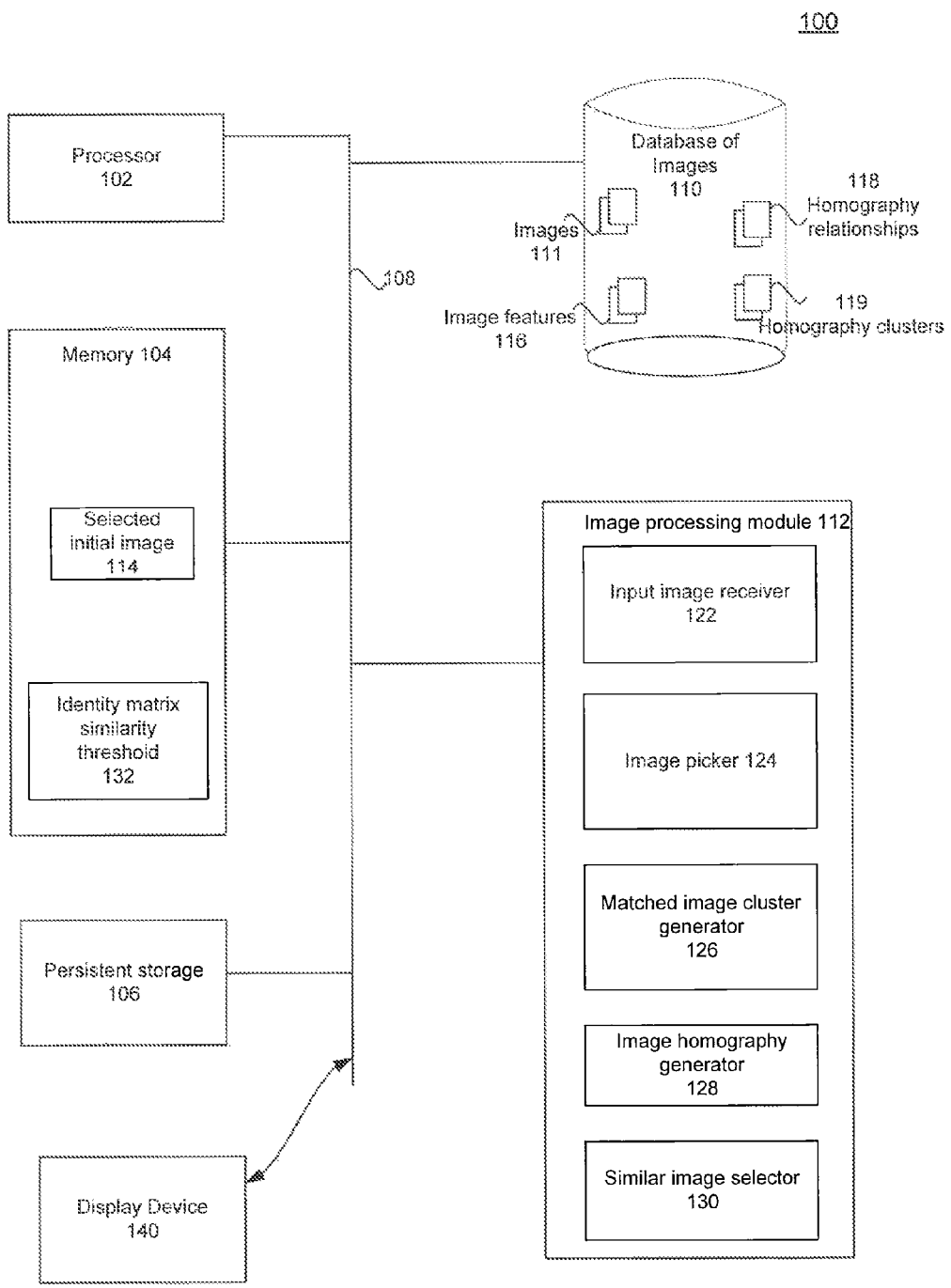
FIG. 1 illustrates a system for selecting similar images to display, according to an embodiment.

This disclosure is generally directed to methods and systems to present similar images from image collections, such as large collections of images that are accessible over the Internet. The selected similar images are similar in scene as well as in perspective. For example, similar images include images that have the same or similar scene captured using nearby camera perspectives. FIG. 1 illustrates a system 100 for selecting similar images to be displayed in accordance with an embodiment. System 100 includes one or more processors 102, a memory 104, a persistent storage 106, a communications infrastructure 108, a database of images 110, and an image processing module 112. System 100 may also include an associated user interface and/or display device 140. According to an embodiment, system 100 provides a web-based graphical user interface through which users interact with the system to display similar images.

System 100 can be used, for example, in selecting images of landmarks, points of interest, and other imagery that is related to a geographic location. More particularly, system 100 can be used to select and display, from a large collection of images, the most pertinent images to certain images viewed by a user. For example, using methods and systems disclosed herein, a user can efficiently select and view images that are most similar to an image of a landmark that the user first selected. The methods and systems disclosed herein are particularly advantageous over conventional methods considering the magnitude, as well as the dynamic nature, of the collection of images that is, for example, available over the Internet.

Processor 102 may include any computer or electronic processor for executing and/or processing information. Processor 102 may include or be part of any device capable of processing any sequence of instructions. Processor 102 may include, for example, a computer processor, a processor in a mobile device or other electronic and/or digital processor. Processor 102 may, for example, be included in a computer, a mobile computing device, a set-top box, an entertainment platform, a server, a camera or other image capture device, a server farm, a cloud computer, and the like.

Processor 102 may be connected to a memory 104 via a bus 108. A memory 104 may include volatile memory, persistent, virtual or otherwise, to store information for use by or output by the system 100. Memory 104 may include, for example, random access memory (RAM) and/or dynamic RAM (DRAM). Memory 104 may be used to store any information, such as state information of system 100. Memory 104, for example, may also be used to store instructions of system 100, including instructions of image processing module 112. System 100 may include one or more processors 102 as necessary or appropriate.

Bus 108 may include a communication infrastructure that allows interaction between the various components of system 100. Bus 108 may, for example, carry data between the components of system 100, such as between processor 102 and memory 104. Bus 108 may include a wireless and/or wired communications medium between the components of system 100, and may include parallel, serial or other topological arrangements.

A persistent storage 106 may include components such memory or other persistent storage as is used by system 100 to store data over some extended period of time (e.g., as compared to memory 104). Persistent storage 106 may include non-volatile main memory as used by processor 102 in system 100. Persistent storage 106 may include, for example, flash memory, a hard disk or optical disk.

A database 110 may include any structured or organized manner of storing data. Database 110 may include image data and/or pointers to collections of images at various local or remote locations. For example, database 110 may include images 111, such as user contributed photographs, obtained from the Internet or other source, which have been and/or are to be processed by system 100 (as discussed in greater detail below) and stored for further processing by system 100. Database 110 may store other information pertaining to the images as well, including but not limited to geo-location information for respective images, tag information, and related image information. According to another embodiment, database 110 may include an index of pointers to image collections available at various network accessible locations.

Database 110 can further include image features 116, homography relationships 118, and homography clusters 119. Image features 116 include feature sets determined for respective images in images 111. Image features are characteristics of the respective images. Image features that are determined for image matching can include, for example, edge information and other geometric prominent features, texture information, and color information. Homography relationships 118 include the homography relationships determined between images in images 111. Homography relationships are described below in relationship with the image homography generator 128. Homography clusters 119 include clusters of images formed based upon homographic relationships. Homography clusters 119 may be formed using a method, such as, but not limited to, the process illustrated in FIG. 3A.

Image processing module 112 may, through its components as shown in FIG. 1, process an input image 114 to determine which, if any, of the images accessible through database 110 are most similar to an input image 114. Input image 114 may be an image currently displayed to the user. The input image may also be an image that is input to the image processing system 112 by the user. According to an embodiment, image processing module 112 may, responsive to an input such as a geo-location received from a user, return an image selected based upon the image's homography relationships with other images in an image collection. Image processing module 112 can include an input image receiver 122, an image picker 124, matched image cluster generator 126, image homography generator 128, and similar image selector 130. Input image 114 is also referred to as the selected input image in this disclosure.

Input image receiver 122 may operate to receive an input image 114. According to an example embodiment, through input image receiver 122, a user may select image 114 to be input into the system 100 for processing. Or, for example, input image receiver 122 may receive image 114 from database 110, memory 104, persistent storage 106 and/or another location, such as the Internet, universal serial bus (USB) drive or other source or networked connection.

Input image 114 may include any image received by or otherwise input into system 100 for processing. Input image 114 may include, for example, a static or still image, such as a photograph, drawing, or rendering of some kind. Input image 114 may include a photograph frame taken from a series of frames from a video or other sequence of images, or any other captured or created image, digital or otherwise. According to an example embodiment, input image 114 may include several images, one or more of which are to be selected for processing by system 100.

Input image 114 may include one or more landmarks, point of interest, or other object or collection of objects that have a geographic relationship and have an associated geo-location. An example of an input image 114 may be the street-view of a particular location, where the image includes a landmark as well as surrounding objects such as a road, trees, and buildings. Input image 114 may be selected from images 111 in database 110 in response to receiving an input of a geo-location coordinate from a user through a user interface. For example, a user of a map application through a web-based interface may indicate a particular geo-location by clicking on a location with a mouse. Input image 114 may be selected as an image that has matching geo-coordinates to the coordinates of the clicked-on location. According to another embodiment, input image 114 may be a photograph captured by the user which is being currently uploaded to a system and/or collection of images.

Image picker 124 operates to pick an image for presentation in response to a received user input, such as a geo-location. According to an embodiment, image picker 124 selects an image to be displayed to the user based upon the user input and homographic relationships of respective images. Selecting a first image to be displayed, or a selected input image, is further described below in relation to FIG. 2.

Figure 3A:
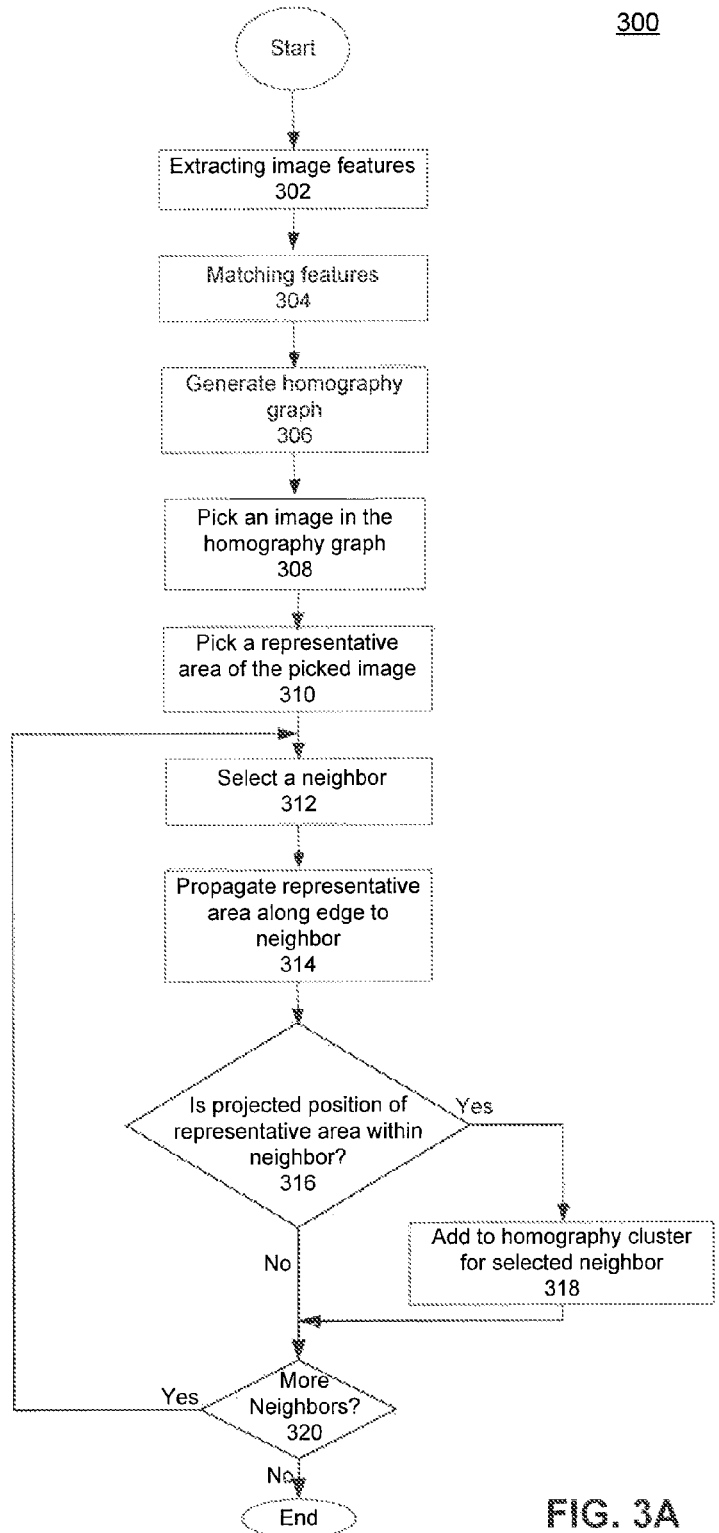
FIG. 3A illustrates a method for generating image clusters based upon homography relationships, according to an embodiment.

Matched image cluster generator 126 operates to cluster images 111 according to various characteristics such as image features, keypoints, geo-location information, and/or tag information. The clustering of images 111, according to an embodiment, is directed to making the homography relationships more efficient. According to an embodiment, images with matching features are clustered based on homographic relationships between them. An identity matrix similarity threshold 132 may be used in determining whether a homographic relationship represents an exact match or close match between a pair of images. The identity matrix similarity threshold is described further in relation to FIG. 5 below. FIG. 3A illustrates a method of homographic cluster generation that may be implemented in matched image cluster generator 126. According to an embodiment, homographic clusters 119 can be generated from images 111 and stored in database 110.

Image homography generator 128 operates to determine a pairwise homography relationship between input image 114 and respective ones of images 111. If two images have a planar region of overlap, then a transformation called a homography can be computed. A homography defines a transformation of the pixels of the first image to the pixels in the other image. According to an embodiment, a homography relationship between two images is defined as a 3×3 matrix. For example, the 3×3 homography matrix M relates pixel coordinates in the first and second images if x'=Mx, where x and x' are pixels in the first and second images, respectively.

Similar image selector 130 selects images for presentation to the user. According to an embodiment, similar image selector 130 operates to select an image from a homographic cluster 119. According to another embodiment, an image is selected for presentation to the user based upon a homography relationship 118 with the currently displayed image. The image selected for presentation to the user, is selected based upon its feature similarity as well as image perspective similarity to the selected input image.

Figure 2:
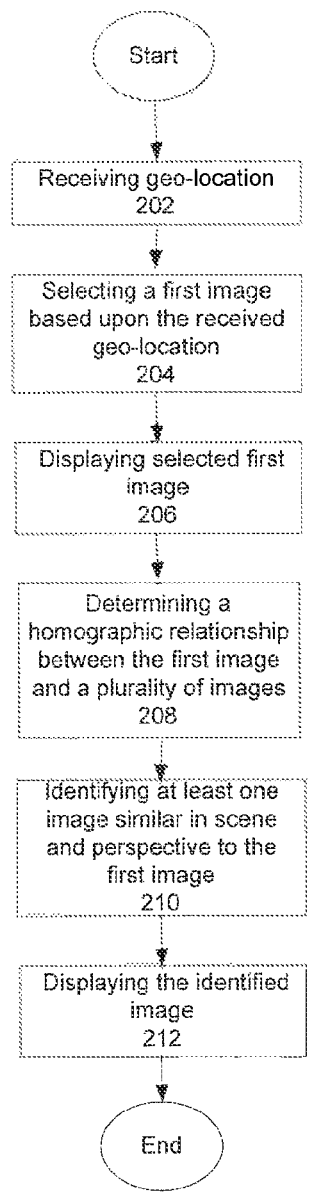
FIG. 2 illustrates a method for displaying similar images, according to an embodiment.

FIG. 2 illustrates a process 200 for presenting images to a user from a collection of images. Process 200 can be used, for example, to display images from a large collection of images as one or more groups of images that are most similar to each other in image features and perspective. At step 202, a geo-location is received as input from a user. For example, while viewing a map displayed on a web-based graphical user interface (GUI), a user may indicate an interest on a particular geographic location by performing a mouse click at a corresponding location of the map. The geo-location may be received as a latitude and longitude pair. According to other embodiments, the geo-location may be received as tuple of latitude, longitude, and altitude, and/or any other representations of geographic locations.

At step 204, a first image is selected to be displayed to the user. The first image is selected based upon the received geo-location coordinates.

The first image may be further selected based upon similarity groups of images that are closest to the received geo-location. For example, images in an image collection that have geo-coordinates that are within some predetermined radius of the received geo-coordinates may be clustered into similarity clusters based upon image feature matching and on homographic relations. Upon receiving a geo-location coordinate as input from the user, system 100, for example, may display thumbnail images from each of the corresponding similarity clusters, so that the user can select which of the similarity clusters he wishes to view. According to another embodiment, an image may be selected from a "best" similarity cluster corresponding to the received geo-location. Each similarity cluster primarily contains images that are similar in image features as well as in image perspective. The generation of similarity clusters based upon image feature matching as well as similar perspective is described below in relation to FIG. 3A.

At step 206, the first image is displayed to the user. The first image may be displayed using the same or a different interface as the interface through which the user input was received. For example, a separate picture viewer may be spawned to display the first image to the user. The first image, or the image that is initially displayed to the user, is referred to herein as the "selected initial image."

At step 208, homography relationships between images are determined. According to an embodiment, homography relationships may be determined between the image displayed to the user at step 206 and other images in an image collection. In some embodiments, homography relationships among images may have been previously computed and stored in an accessible manner. For example, when similarity groups are created beforehand using process 300 illustrated in FIG. 3A and stored, homography relationships between images may also be computed and stored. In other embodiments, homography relationships are computed at this step. Computing of homography relationships is described below in relation to FIG. 4.

At step 210, an image is selected for display based upon the initially displayed image (i.e., selected initial image). According to an embodiment, the image is selected based upon the level of similarity of image features and the level of similarity of the image perspective between the earlier displayed selected initial image and the currently selected image. The currently selected image is selected from the same homography cluster as the selected initial image. According to an embodiment, the pair-wise homographic relationship between the currently selected image and the selected initial image substantially corresponds to an identity matrix. According to yet another embodiment, the currently selected image is an image from the same homography cluster as the selected initial image which has not been displayed yet and which has a homography relationship with the earlier displayed image which is closest to the identity matrix. The desired level of the correspondence of the homography matrix between the selected initial image and subsequently displayed images to the identity matrix may be configurable as a similarity threshold 132 (referred to as an "identity matrix similarity threshold"). As described below in relation to FIG. 5, the norms of the respective homography matrices may be used in determining the level of correspondence of the homography matrices to the identity matrix. Currently selected images that have a homography relationship with the selected initial image corresponding to the identity matrix, or corresponding to a level of matching to the identity matrix exceeding a configured similarity threshold, are selected for display to the user.

At step 212, the one or more currently selected images are displayed.

FIG. 3A illustrates a process 300 that can be used to generate homography clusters. According to an embodiment, process 300 is executed using images 111 as input in order to generate homography clusters 118.

At step 302, feature extraction is performed on respective images 111. Extracted features may be stored for later use in database 110 as image features 116. Extracted features may be keypoints, edges, and/or other distinct image characteristics. Any feature extraction technique, such as, for example, the conventional SIFT image feature extraction, can be used to extract the features of images 111.

At step 304 images 111 are matched pairwise to determine matching images. A pair of images that have above a threshold of matching features may be considered as a matching image pair. The threshold of matching features may be configurable, and may be based upon factors, such as, but not limited to, percentage of matching features, type of images, and matching of key features.

At step 306 one or more homography graphs are created. According to an embodiment, each image is a node in the homography graph of images 111. An edge is drawn from a node to each other node that represents a matching image. The matching images are based upon matches between extracted features of the respective images. An edge between two images is represented by the homography relationship between the two images. For example, an edge between images A and B would represent the homography transformation from image A to image B. As described above, a homography relationship between the two images can be represented as a 3×3 (or n×n, where n>3) matrix.

Figure 3B:
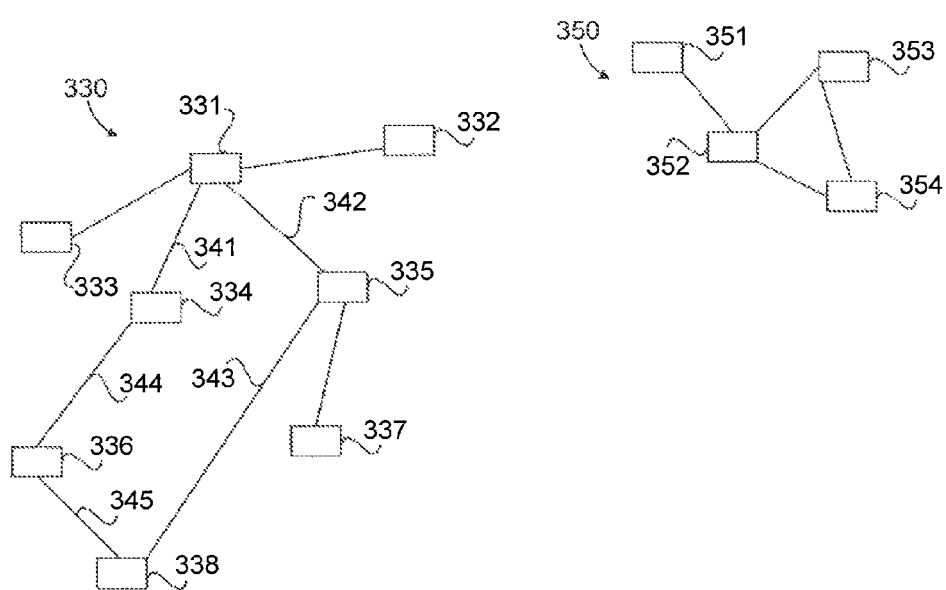
FIG. 3B illustrates a part of an example homography graph, according to an embodiment.

FIG. 3B illustrates an example representation of a portion of a homography graph 325. Homography graph 325 may represent the homography relationships of a collection of images. Each node 331-338 and 351-354 represents an image in the collection. A homography relationship between two images is represented by an edge between the two corresponding nodes (e.g., edges 341-345). A homography matrix (not shown), specifying the corresponding homography relationship, may be associated with each edge. Two nodes connected by an edge may be referred to as "neighbors." Homography graph 325 may form a single connected graph, or may include two or more disjoint subgraphs. The two subgraphs 330 and 350, for example, may represent first and second sets of images in the collection, where there is no relevant homographic relationship between any image in the first set and any image in the second. Returning to FIG. 3A, steps 308-320 illustrate the generation of homography clusters from images for which feature extraction and feature matching information is already available. For example, steps 308-320 are used to generate homography clusters from images 111. For each image in images 111, a corresponding homography cluster is generated using steps 308-320. A homography cluster may have one or more images depending on the level of image feature matching and the level of homographic relationships that the subject image of the cluster has.

At step 308, a subject image is selected. The "subject image" is the image for which the homography cluster is being created in the current iteration. Steps 308-320, according to an embodiment, are repeated for each image in images 111. In other embodiments, steps 308-320 may be performed for selected images of images 111. Subject images for performing steps 308-320 can be selected randomly from images 111 or according to some criteria such as selecting based on a ranking of popularity of images.

At step 310, a representative area from the image is selected. The "representative area" can be a single point on the image or an area defined by any polygon. According to an embodiment, the center of the image is selected as the representative area.

At step 312, a neighbor of the subject image is selected. For example, a node connected by an edge to the node corresponding to the subject image in the homography graph is selected. The neighbors may be selected randomly. According to some embodiments, steps 312-320 can be performed on all neighbors of the subject image in parallel. Steps 312-320 are a recursive process to be performed on each neighbor.

At step 314, the representative area is propagated to the neighbor. Propagating the representative area to the neighbor comprises computing the location of the projection of the representative area in the neighbor based upon the homography relationship that is represented along the edge between the subject image and the selected neighbor.

At step 316, it is determined whether the position of the projected representative area from the subject image on the selected neighbor is within a predetermined "significant area" of the image. According to an embodiment, the significant area of an image may include the entire image. In that case, if the representative area falls anywhere within the neighbor image, it is considered that the representative area is validly projected onto the neighbor. According to another embodiment, the significant area of an image may include only an area defined by a predetermined radius or boundary area based on the center or other point of the neighbor image.

If it is determined that the projected representative area is within the significant area of the selected neighbor, then in step 318 the selected neighbor is added to the homography cluster of the subject image. Further, steps 312-320 are performed on each neighbor of the selected neighbor to propagate the representative area of the subject image to the neighbors of the neighbor. The propagation is performed by considering the homography relationship represented on each edge between the subject image and the newly selected image. According to an embodiment, the propagation is performed by multiplying the homography matrices along the edges and the representative area in order to determine the placement of the projection of the representative area within the newly selected image. The process is repeated recursively for neighbors and neighbors of neighbors as long as the representative area is located within the significant area of the newly selected image and each neighbor and each neighbor's neighbor are added to the homography cluster of the subject image.

If it is determined that the projected representative area is not within the significant area of the selected neighbor, then that neighbor is not added to the homography cluster of the subject image and none of that neighbor's neighbors are considered for projecting the representative area.

Subsequent to step 318 process 300 proceeds to step 320. Step 320 may also be reached when in step 316 it is determined that the projected representative area is not within the significant area of the selected neighbor. At step 320, it is determined whether there are yet more neighbors to be considered. If yes, process 300 proceeds to step 312 to select the next available neighbor. If not, process 300 ends.

When process 300 ends, a plurality of homography clusters has been generated. The homography clusters represent, for respective images in images 111, matching images in features and in perspective. As described above, the level of match for generating the clusters can be configurable.

Figure 4:
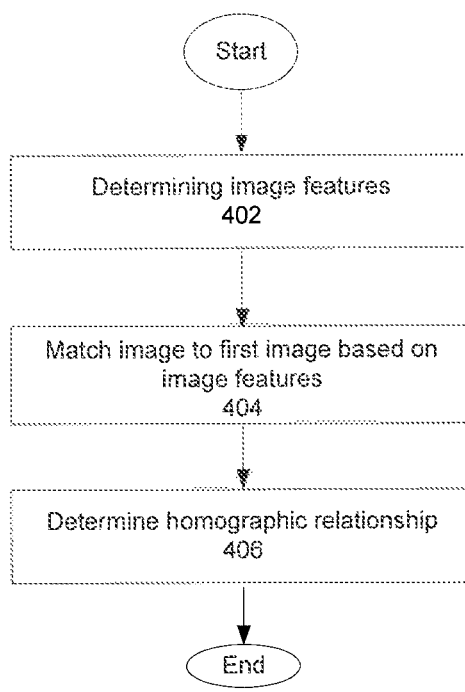
FIG. 4 illustrates a method for determining homographic images, according to an embodiment.

FIG. 4 illustrates process 400 for determining a homography relationship between images, such as, for example, a selected initial image and another image. Process 400 can be used, for example, to present images that are similar to an image without access to precomputed homography clusters. Process 400 can be used, for example, in performing step 208 of process 200 described above.

At step 402, image feature extraction is performed on one or more images. At step 404, matching of image features is performed between the selected initial image and the one or more images for which feature extraction was performed. Feature extraction and matching based on image features was described above with respect to FIGS. 2 and 3A.

At step 406, a homography relationship is determined between the selected input image and the one or more images that match the selected input image based upon extracted image features. According to an embodiment, homography relationships are determined for each image that has matching features above a threshold. As described above, homography relationships can be represented as 3×3 homography matrices.

Figure 5:
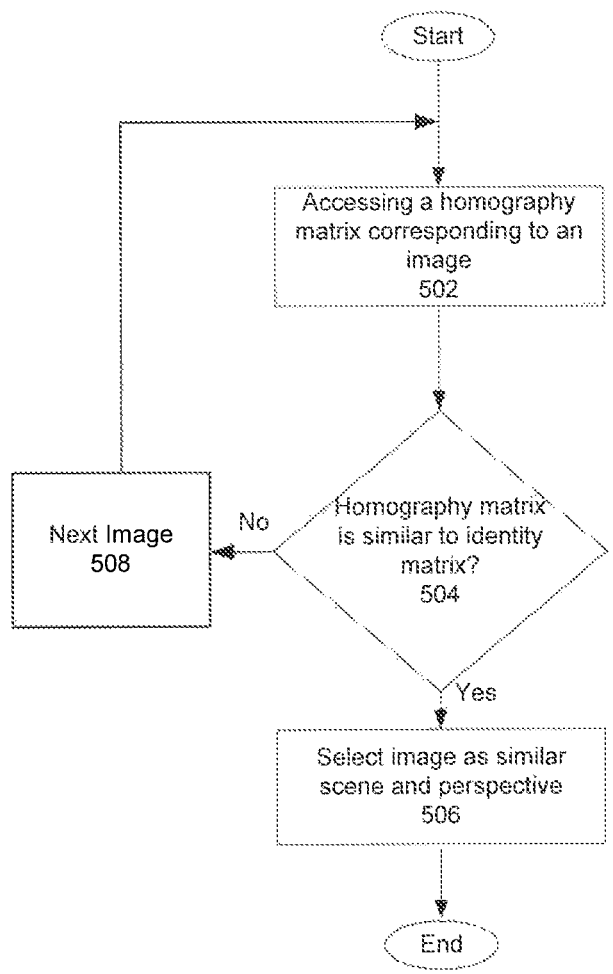
FIG. 5 illustrates a method for selecting images to display based upon a desired homography relationship, according to an embodiment.

FIG. 5 illustrates a process 500 for selecting an image to display, wherein the image is selected based upon having similar features and similar image perspective to a selected input image. The image to display is selected based upon characteristics of the homography transformation between the image to display and the selected input image. As described above, the selected input image is an earlier displayed image for which similar images are now sought. According to an embodiment, steps 502-508 are repeated until a suitable image to display is found. In another embodiment, steps 502-508 are repeated until all images that have the desired homography relationship to the selected input image are displayed.

At step 502, a homography relationship associated with the selected input image is accessed. The accessed homography relationship defines the homography transformation from the selected input image to an image being considered to display next. The homography relationships may be previously computed and stored for later use, for example in database 110 as shown in FIG. 1. Precomputing of homographic relationships and clustering according to homographic similarity were described above with respect to FIG. 3A. The use of precomputed homography relationships may be preferable when the selected input image is from previously processed images, such as images 111, as described in relation to FIG. 3A. According to another embodiment, the homography relationship is determined dynamically by considering the selected input image. For example, when the selected input image has not been previously processed in system 100, feature matching and homography relationship matching between the selected input image and other images may be performed dynamically, such as, for example, described above in relation to FIG. 4.

At step 504, it is determined whether the correspondence of the accessed homography relationship to the identity matrix is within a threshold. The threshold, referred to herein as the identity matrix similarity threshold, may be determined based upon user configuration or by dynamic computation based upon characteristics of the collection of images. For example, the identity matrix similarity threshold may be configured to require an exact match to an identity matrix when an area of interest has a large number of accessible images including images that have pair-wise homography relationships that are close to an identity matrix. The identity matrix similarity threshold may be configured to require an exact match or a close match when only a few accessible images are available for an area and/or when only very few images have pair-wise homography relationships that correspond to an identity matrix. According to an embodiment, the correspondence of the accessed homography relationship to the identity matrix is determined by the absolute value of the difference between the norm of the homography matrix corresponding to the accessed homography relationship and the norm of the identity matrix (e.g., $\|H\|-\|I\|$, where H is the homography matrix and I is the identity matrix). The norm may be determined according to a technique such as, but not limited to, one-norm, largest singular value norm, infinity norm, or Frobenius-norm. The difference may be determined by subtracting one norm from the other. An exact match would result in a norm difference of zero. Thus, an identity matrix similarity threshold directed to selecting exact matches would be set to a value of zero. A close match would result in a norm difference close to zero, and therefore, an identity matrix similarity threshold to select close matches would be set to a value close to zero. According to another embodiment, the correspondence of the accessed homography relationship to the identity matrix can be determined based on the norm of the difference between the homography matrix corresponding to the accessed homography relationship and the identity matrix (e.g., $\|H-I\|$).

The value of the identity matrix similarity threshold can be configured based upon user preferences and/or characteristics of images in the collection.

If, in step 504, it is determined that the homography relationship is within the desired threshold from an identity matrix, then the current image to display is displayed as the image of similar image characteristics and similar perspective as the selected input image. Otherwise, in step 508, the next available image is selected for consideration and processing proceeds to step 502.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for presenting similar images on a display device, comprising:
    displaying a first image on the display device;
    determining one or more homographic relationships between the first image and a plurality of images;
    identifying, using the determined one or more homographic relationships, at least one image having a scene and a perspective which are similar to those of the first image; and
    displaying the identified image;
    wherein the determining one or more homographic relationships comprises:
        creating a homography graph from a collection of images, wherein respective images of the collection are nodes of the graph and two nodes of the graph have an edge between them if the two nodes have matching image features, and wherein a cost of the edge is a homography relationship between the two nodes;
        generating homography clusters for respective images of the collection of images using the created homography graph; and
        determining a homographic relationship between images of one of the generated homography clusters.

2. The computer-implemented method of claim 1, wherein the scene of the identified image is substantially the same as that of the first image, and wherein the perspective of the identified image is nearby to that of the first image.

3. The computer-implemented method of claim 2, wherein the identifying includes:

accessing a homography matrix associated with one of the plurality of images; and selecting the one of the images as the identified image wherein the accessed homography matrix is substantially an identity matrix.

4. The computer-implemented method of claim 3, wherein the selecting is based upon a similarity threshold between the accessed homography matrix and the identity matrix.

5. The computer-implemented method of claim 1, further comprising:

receiving a user-selected geographic location coordinate; and selecting the first image based upon the received geographic location coordinate.

6. The computer-implemented method of claim 5, wherein the selecting the first image comprises:

identifying an image associated with a corresponding geographic location coordinate, wherein the image is included in a cluster from a plurality of homographic clusters, and wherein the plurality of homographic clusters is generated using a homography graph; and returning the identified image as the selected first image.

7. The computer-implemented method of claim 1, further comprising:

matching of the first image to respective images of a collection of images based upon image features to determine the plurality of images.

8. The computer-implemented method of claim 1, wherein the generating homography clusters comprises:

selecting a node in the homography graph;

propagating, recursively to each neighbor of the node, a representative area; and adding the neighbor to a homography cluster of the node if the propagated representative area is within a significant area of a corresponding image of the neighbor.

9. The computer-implemented method of claim 8, wherein the propagating of the representative area is performed by transforming the representative area using the homography relationship corresponding to the edge between the two nodes.

10. The computer-implemented method of claim 1, wherein respective ones of the generated homography clusters include images that are not immediate neighbors in the homography graph.

11. A system for presenting similar images, comprising:

a processor;

a display device coupled to the processor and configured to display a first image;

an image homography generator executed on the processor and configured to determine homographic relationships between the first image and a plurality of images; and a similar image selector executed on the processor and configured to identify, using the determined homographic relationships, at least one image having a scene and a perspective which are substantially similar to those of the first image;

wherein the image homography generator is further configured to determine one or more homographic relationships by:

creating a homography graph from a collection of images, wherein respective images of the collection are nodes of the graph and two nodes of the graph have an edge between them if the two nodes have matching image features, and wherein a cost of the edge is a homography relationship between the two nodes;

generating homography clusters for respective images of the collection of images using the created homography graph; and determining a homographic relationship between images of one of the generated homography clusters.

12. The system of claim 11, wherein the similar image selector is further configured to identify the at least one image, wherein the scene of the identified image is substantially the same as that of the first image, and wherein the perspective of the identified image is nearby to that of the first image.

13. The system of claim 11, wherein the similar image selector is further configured to:

access a homography matrix associated with the first image and one of the plurality of images; and select the one of the images as the identified image wherein the accessed homography matrix is substantially an identity matrix.

14. The system of claim 13, wherein the selecting is based upon a similarity threshold between the homography matrix and the identity matrix.

15. The system of claim 11, further comprising an initial image picker executed on the processor and configured to:

receive a user-selected geographic location coordinate; and select the first image based upon the received geographic location coordinate.

16. The system of claim 11, further comprising a matched image cluster generator executed on the processor and configured to match the first image to respective images of a collection of images based upon image features to generate the plurality of images.

17. An article of manufacture comprising a non-transitory computer readable medium encoding instructions thereon that in response to execution by a computing device cause the computing device to perform operations comprising:

displaying a first image on the display device;

determining homographic relationships between the first image and a plurality of images;

identifying, using the determined homographic relationships, at least one image having a scene and a perspective which are substantially similar to that of the first image; and displaying the identified image;

wherein the determining homographic relationships comprises:

creating a homography graph from a collection of images, wherein respective images of the collection are nodes of the graph and two nodes of the graph have an edge between them if the two nodes have matching image features, and wherein a cost of the edge is a homography relationship between the two nodes;

generating homography clusters for respective images of the collection of images using the created homography graph; and determining a homographic relationship between images of one of the generated homography clusters.

18. The article of manufacture of claim 17, wherein the identifying includes:

accessing a homography matrix associated with one of the plurality of images; and selecting the one of the images as the identified image wherein the accessed homography matrix is substantially an identity matrix.

* * * * *